United States Patent [19]
Carpenter

[11] 3,968,549
[45] July 13, 1976

[54] CUTTING TOOL

[75] Inventor: Edwin A. Carpenter, Milwaukee, Wis.

[73] Assignee: Allied Tool Products, Inc., Milwaukee, Wis.

[22] Filed: Sept. 23, 1974

[21] Appl. No.: 508,425

Related U.S. Application Data

[62] Division of Ser. No. 237,157, March 22, 1972.

[52] U.S. Cl. ................................. 29/95 R
[51] Int. Cl.² .......................... B26D 1/00
[58] Field of Search .............. 29/95 R, 96

[56] References Cited
UNITED STATES PATENTS

| | | | |
|---|---|---|---|
| 613,264 | 11/1898 | Goddard | 29/96 |
| 3,088,141 | 5/1963 | Tansey | 10/101 |
| 3,205,558 | 9/1965 | Stier | 29/96 |
| 3,518,737 | 7/1970 | Hood | 29/96 |
| 3,754,309 | 8/1973 | Jones et al. | 29/96 |
| 3,812,560 | 5/1974 | Mihic et al. | 29/96 |

Primary Examiner—Leonidas Vlachos
Attorney, Agent, or Firm—Fred Wiviott

[57] ABSTRACT

A thread cutting tool including a removable cutting insert and a tool holder having engagable co-acting surfaces on the sides of the insert opposite that acted upon by the cutting forces so that these forces tend to hold in a fixed relationship relative to the holder. The insert is mounted on the tool at an angle substantially one-half the angle of the cutting tip so that only a single ground face is required.

3 Claims, 10 Drawing Figures

CUTTING TOOL

This is a division of application Ser. No. 237,157, filed Mar. 22, 1972.

BACKGROUND OF THE INVENTION

Thread cutting tools conventionally include a cutting insert secured in a fixed position to a tool holder. In prior art tools, cutting forces acting against the insert clamp, tended to cause the insert to chatter and shift its position in the holder. This adversely affected the proper performance of a cutting operation. Maintaining the position of the insert is especially important when used on numerically controlled machines where various tools are automatically positioned for different machining operations. If the insert is not securely held in the holder, the cutter position will not be repeated accurately on successive workpieces with a resulting variation in the machined products.

The present invention eliminates many of the foregoing problems by providing an insert and a cooperating holder configured in such a manner that cutting forces on the insert act to maintain the position of the insert in the tool holder. Thus, the insert is not solely dependent upon the securing clamp to maintain it in the desired position relative to the holder.

In prior art, the cutting point of thread cutting inserts normally comprise two cutting faces forming a 60 degree angle. To resharpen inserts of this type, it is necessary to grind both faces to keep the apex of the cutting surfaces in a plane bisecting the angle formed by them. The present invention utilizes a mounting face and a second face forming a 60 degree angle with it to provide a cutting tip. To resharpen only the second face is ground and the apex remains in the plane of the mounting surface.

OBJECT OF THE INVENTION

An object of the invention is to provide a thread cutting tool whose insert will not tend to move under the influence of cutting forces.

A further object of the invention is to provide a thread cutting insert which can be sharpened by grinding a single cutting face.

Another object of the invention is to provide a thread cutting insert having two cutting points which is reversible in its holder.

These and other objects and advantages of the present invention will become more apparent from the detailed description thereof taken with the accompanying drawings.

DESCRIPTION OF THE PREFERRED EMBODIMENTS

Figure 1:
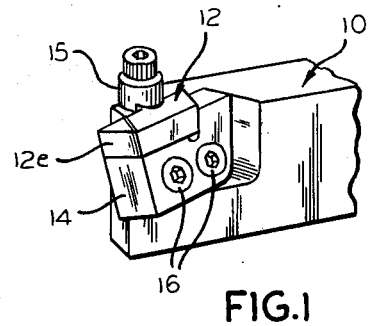
FIG. 1 is a perspective view of the thread cutting tool according to one embodiment of the invention.
Figure 2:
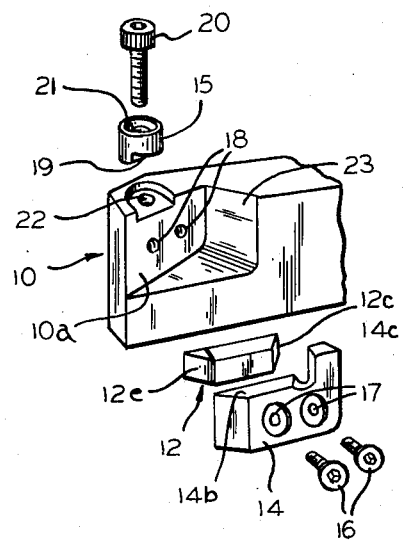
FIG. 2 is an exploded perspective view of the tool illustrated in FIG. 1.

With reference to FIGS. 1–5, the thread cutting tool according to the preferred embodiment of the invention is shown to include a tool holder 10 and a cutting insert 12. The holder 10 may be provided with an insert supporting anvil 14 and a clamp 15. The anvil may be attached to the holder 10 by any suitable means such as screws 16 which pass through openings 17 in anvil 14 and are received in threaded holes 18 in surface 10a of holder 10. Clamp 15 has an insert engaging notch 19 formed in its lower end and is mounted by means of a screw 20 which passes through an opening 21 in clamp 15 and is received in a threaded hole 22 in the top of holder 10.

Figure 5:
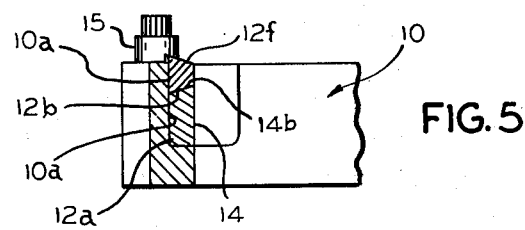
FIG. 5 is a view taken along FIG. 5—5 of FIG. 3.

The holder may be provided with an insert receiving recess 23 having the side surface 10a which is preferably formed at an angle of 60 degrees relative to a vertical plane containing the longitudinal axis of holder 10. The insert 12 and anvil 14 respectively include locating surfaces 12a and 14a which are mounted against surface 10a. In addition, the anvil 14 has an insert receiving notch 15 defined by surfaces 14b and 14c each of which are formed at an acute angle relative to surface 10a of holder 10. The insert 12 is formed with surfaces 12b and 12c which are complimentary with and engage surfaces 14b and 14c when insert 12 is mounted in its operative position. More specifically, the surface 14b extends downwardly and inwardly relative to surface 10a and surface 14c extends obliquely down and toward the rear from top to bottom and in and toward the rear from the outer to the inner side. The insert 12 is shown in FIG. 5 to be generally trapezoidal in a cross section taken through its longitudinal axis wherein surface 12b is complimentary with surface 14b when surface 12a engages surface 10a of holder 10. Similarly, the surface 12c is complimentary with surface 14c when the insert is in its operative position shown in the drawings. The engagement between surfaces 12b and 14b tends to prevent movement of the insert 12 away from surface 10a. Further, because surface 14c overlays surface 12c, upward tilting movement of this end of the insert is prevented.

Figure 3:
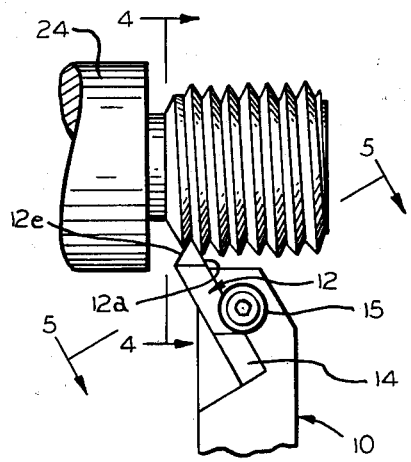
FIG. 3 is a top plane view of the embodiment of FIG. 1.
Figure 4:
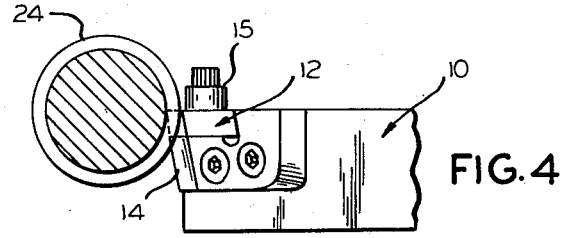
FIG. 4 is a view taken along line 4—4 of FIG. 3.

It will be appreciated that when the insert is engaged with a work piece 24, as seen in FIGS. 3 and 4, force components on insert 12 will act downwardly as viewed in FIG. 4 and to the right as viewed in FIG. 3. These forces will tend to force insert faces 12a and 12b against the surfaces 10a and 14b and face 12c against surface 14c. Accordingly, these forces tend to suppliment the clamp 15 and thereby to hold insert 12. Also these forces would tend to hold insert 12 in position during operation should the clamp 15 become loosened.

In the preferred embodiment of the invention, the opposite end faces 12c and 12e of the insert 12 are formed at the same angle relative to mounting face 12a and in opposite directions. In the standard thread cutter, this angle is approximately 60 degrees. Also the faces 12c and 12e are tilted at a slight angle as shown in FIG. 6B. This provides both clearance at the cutting end but also a mating surface for surface 14c of anvil 14. Similarly, the bottom and top surfaces 12b and 12e of the insert 12 are formed at the same angle relative to the surface 12a and in the opposite directions.

Referring now specifically to FIG. 3, the mounting of insert 12 on the 60 degree surface 10a and the 60 degree surface angle between surfaces 12a and 12d provides an internal included angle of 60 degrees presented by insert 12 to the work piece 24. In addition, a plane parallel to the longitudinal axis of holder 10 and passing through the apex of the faces 12a and 12e, bisects the angle. In this manner, the 60 degree cutting tip on insert 12 is provided with only a single face 12c or 12e at each end requiring grinding. Further, the arrangement of faces permits either end to be used for cutting. More specifically, when the insert is rotated 180 degrees about an axis perpendicular to surface 12a end face 12e will fit beneath surface 14c and face 12c will be in a proper cutting position.

Figure 7:
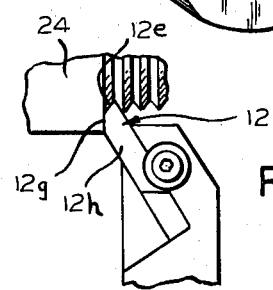
FIG. 7 is a top plane view of an alternate embodiment of the invention.

Referring now to FIG. 7, the insert 12 may have a clearance surface 12g ground between surfaces 12d and 12e and in a direction generally parallel to the longitudinal axis of holder 10. This permits the thread to be cut down to the shoulder of the work piece 24.

Figures 6A, 6C:
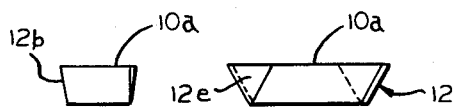
FIGS. 6A, 6B and 6C are various views of the cutting insert of the tool illustrated in FIG. 1.
Figure 6B:
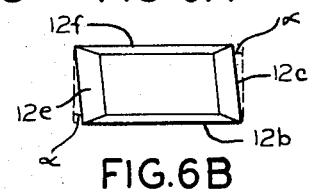
Figure 8:
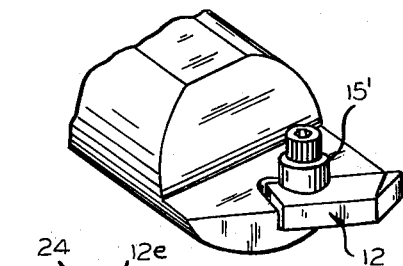
FIG. 8 is a perspective view of yet another embodiment of the invention.

Yet another alternative embodiment of the present invention is shown in FIG. 6. In this configuration, the insert 12' is oriented to perform internal threading operations whereas in the embodiment of FIGS. 1–7, insert 12 is oriented for external threading cutting, although neither embodiment need be limited to such operations. The threading tool in FIG. 8 includes a tool holder 10', cutting insert 12' and a clamp 15'. The embodiment of FIG. 6 also illustrates that the anvil may be eliminated with the insert receiving surface formed directly in the holder 10'. More specifically, holder 10' has a recess formed therein having mounting surfaces with substantially the same configuration as surfaces 10a, 14b and 14c of the embodiment of FIGS. 1–7. Insert 12' has substantially the same configuration as insert 12 so that it will not be described for the sake of brevity in detail. The insert 12' is clamped in place against surfaces 10a, 14b and 14c in the same manner as that of the embodiment in FIGS. 1–7.

While only a few embodiments of the invention have been illustrated and described, it is not intended to be limited thereby but only by the scope of the appended claims.

I claim:

1. A cutting insert adapted to be reversibly mounted in tool holder means, said cutting insert having a cutting tip formed at each end for making a cut in a work piece, a component of the force on said insert resulting from the engagement between said insert and a work piece being directed in a first direction, said insert having a first face on the side thereof presented to the work piece when said insert is in an operative position and a second face on the opposite side, said insert having a third face intersecting said first and second faces at substantially the same angle, said third face being generally parallel to said first direction and adapted to be engaged by a conforming surface formed in a tool holder, said cutting tips being formed by fourth and fifth faces formed respectively on the opposite ends of said insert, said fourth face intersecting said first and third faces and said fifth face intersecting said second and third faces, said faces intersecting at substantially the same angle for each of said cutting tips, whereby said fifth face is adapted to engage an angularly arranged surface on a holder when said insert is positioned with the cutting tip formed by said fourth surface is presented to a work piece and said fourth surface is adapted to engage the same angularly arranged surface when said insert is reoriented with the cutting tip formed by said fifth face is presented to a work piece.

2. The cutting insert set forth in claim 1 wherein said third face lies in a plane which intersects each of said first and second faces at an acute angle.

3. The cutting insert set forth in claim 2 wherein the respective angles of intersection between said fourth and fifth faces and said third faces at each of said cutting tips being substantially 60°.

* * * * *